Aug. 16, 1927.
W. B. FLANDERS
1,639,494
CLEARANCE INDICATOR FOR TURBINES
Filed April 28, 1920.
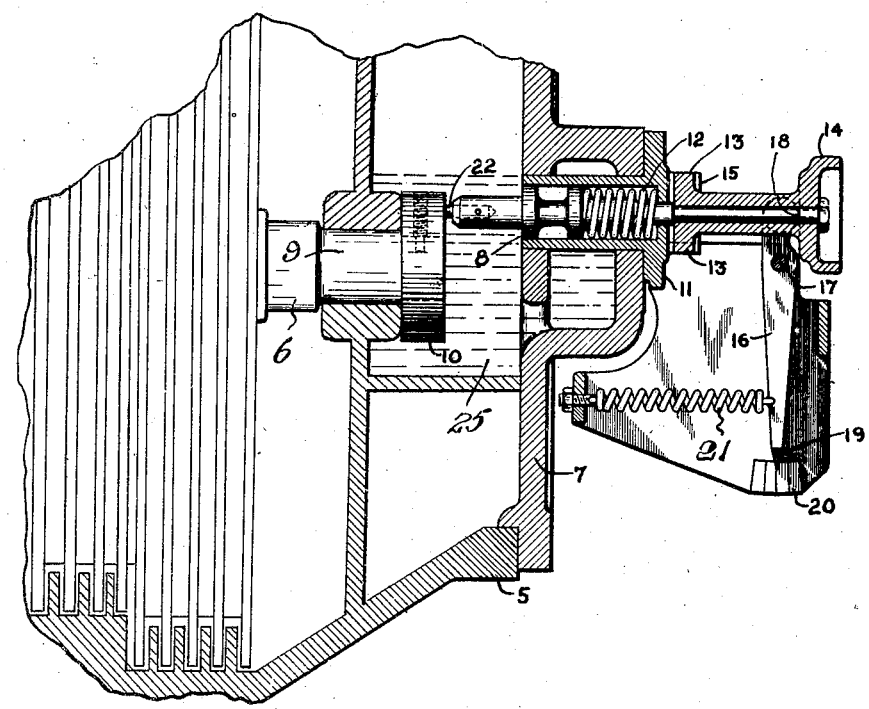
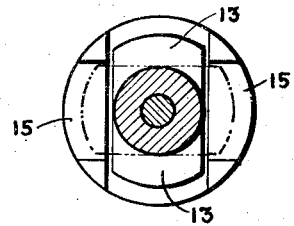
INVENTOR.
Warren B. Flanders
BY D.C.Davis
ATTORNEY Patented Aug. 16, 1927.

1,639,494

UNITED STATES PATENT OFFICE.

WARREN B. FLANDERS, OF ESSINGTON, PENNSYLVANIA, ASSIGNOR TO WESTINGHOUSE ELECTRIC AND MANUFACTURING COMPANY, A CORPORATION OF PENNSYLVANIA.

CLEARANCE INDICATOR FOR TURBINES.

Application filed April 28, 1920. Serial No. 377,412.

My invention relates to clearance indicators for turbines and similar apparatus, and it has for its object to provide apparatus of the character designated that shall be simple and inexpensive in construction and effective and durable in operation in that it may readily be thrown in and out of action and when in action shall indicate the position of the turbine rotor or similar body with great accuracy.

In the accompanying drawing, Fig. 1, is a side view, partially in section and partially in elevation of apparatus illustrating a form of my invention, and Fig. 2 is an end view partially in section of a portion of the apparatus shown in Fig. 1.

In the operation of steam turbines and similar apparatus, it is desirable that the longitudinal position of the rotor be ascertainable with great accuracy, inasmuch as a slight deviation in either direction from the operative position results in serious frictional losses and possible serious injury to the rotor.

It is essential that indicating apparatus of this character shall project through the casing as the rotor itself is entirely enclosed and hence is not susceptible of direct observation.

In accordance with my invention, I mount a plunger in the end of the casing, and I provide a spring tending to force this plunger inwardly against the end of the turbine rotor. Suitable means are then provided for magnifying the longitudinal movement of the plunger and for indicating the resultant magnified movement.

Inasmuch as excessive wear would occur if the plunger remained at all times in contact with the end of the turbine rotor, I preferably further provide means whereby the plunger may be retracted from the turbine rotor and locked in the retracted position.

Referring to the accompanying drawing for a more detailed understanding of my invention, I indicate the casing of a turbine at 5 in Fig. 1, and I further indicate the end portion of the turbine rotor at 6. A cap member 7 is seated in the end of the casing 5 and carries a plunger 8 in longitudinal parallelism with the spindle 9 but preferably in eccentric relation with respect thereto. The spindle 9 may be provided with the collar member 10 against which the plunger 8 is adapted to bear when in its innermost position.

The plunger 8 is seated in a member 11 carried by the cap 7 and is urged inwardly by a spring 12. Externally of the member 11 the plunger 8 carries a pair of lugs 13, 13 (see Fig. 2) and further carries knurled operating knob and lever-contact flange 14. The member 11 is provided with a stepped seat 15 surrounding the plunger 8 for a purpose to be hereinafter more specifically set forth.

A multiplying lever 16 is fulcrumed at 17 on a stationary member 17' supported by the member 11, its short end bears against the inner face of the knob or flange 14 as indicated at 18. The long end of the lever 16 is fashioned into a pointer 19 and is movable over a suitable scale 20 provided on the stationary member 17', contact being maintained at the point 18 as by a spring 21.

Having thus described the arrangement embodied in my invention, the operation of my invention is as follows:

Assuming the parts to be in the position shown, a plunger 8 is forced against the collar 10 by the spring 12 and thus the position of the plunger 8 is accurately indicative of the longitudinal position of the turbine spindle. The spring 21 maintains a short end of the lever 16 in firm engagement with the inner face of the knob 14 and the longitudinal displacement or lack of displacement on plunger 8 is indicated to the greatly magnified scale by the position of the pointer 19 on the scale 20. It will be noted that by the specific arrangement shown, all lost motion is taken up and an extremely accurate indication of the spindle position is obtained.

By forming the collar 10 of hardened steel and by using a hard insert 22 in the end of the plunger, no appreciable wear takes place at this position; and it will be apparent that the exceedingly small amount of wear will be distributed on the member collar 10 due to the eccentric bearing of the pin 22 thereon. The parts 10 and 22, in operation, are adapted to run in oil as by providing an oil sump 25 in which the collar member 10 rotates. Due to the eccentric relation of the insert 22, it will be obvious that a film will be formed and maintained between the contacting surfaces of the collar member 10 and the insert 22. Assuming now that the position of the turbine spindle has been ascertained, it is desirable that the indicator be rendered inoperative in order to eliminate undue friction and wear and for this purpose the knob 14 is withdrawn toward the right so that the lugs 13 move outwardly with respect to the stepped seat 15. The plunger 8 is now turned as for example through 90° so that the lugs 13 assume the dotted positions shown in Fig. 2. Upon now releasing the knob 14 the lugs 13 engage higher steps on the member 15 such that the plunger cannot move inwardly under the influence of the spring 12 so as to engage the member 10.

Upon again desiring to employ the indicator, this operation is reversed, that is to say, the knob 14 is again turned through 90° whereupon the lugs 13 are moved into the appropriate recesses or to the lower seats on the member 15 and the plunger 8 is again permitted to make contact with the end of the turbine spindle.

While I have shown my invention in but one form, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In a longitudinal-position indicator for a rotating body having an end portion adapted to run in oil, the combination with a stationary member adjacent said end portion of the rotating body, of a longitudinally movable member mounted upon said stationary member in eccentric relation to said end portion of the rotating body, means for resiliently holding said movable member in contact with said end portion of the rotating body, said resilient means exerting a constant force upon the movable member, means for maintaining a body of oil in contact with the contacting portions of the movable member and the end portion of the rotating body, means for indicating the resultant position of said movable member, and means for locking said movable member out of engagement with said rotating end portion against the action of said resiliently acting means.

2. In a longitudinal-position indicator for a rotating body, the combination with a stationary member adjacent an end of the rotating body, of a longitudinally movable member mounted upon said stationary member, resilient means for urging said movable member against the end of said rotating body, said resilient means being adapted to exert a constant pressure upon said movable member, means for maintaining a body of oil in contact with the contacting portions of the movable member and the end portion of the rotating body, means for magnifying the longitudinal movement of said movable member, means for indicating the resultant magnified movement, means permitting withdrawal of said movable member out of contact with said rotating member, and means for locking said movable member in the retracted position.

3. In a longitudinal-position indicator, the combination of a rotating body the position of which is to be indicated, a closed casing for one end of the body and adapted to contain oil whereby a film is maintained on said end of the body, a longitudinally movable plunger mounted on said casing and projecting thereinto, and arranged eccentrically with reference to said body and a spring for urging said plunger with a constant force against the end of said rotating body.

4. In a longitudinal-position indicator for a rotating body having one end mounted within a closed casing and adapted to run in oil therein, the combination with a longitudinally movable plunger mounted on said casing and projecting thereinto, of a spring cooperating with the casing for urging said plunger with a constant force against the end of said rotating body, means external of the casing hereby said plunger may be retracted and means for locking it out of contact with said rotating body.

5. In a longitudinal-position indicator for a rotating body having one end mounted within a closed casing and adapted to run in oil therein, the combination with a longitudinally movable plunger mounted on said casing and projecting thereinto, of a spring cooperating with the casing for urging said plunger with a constant force against the end of said rotating body, means for magnifying the movement of said plunger, and means for measuring said magnified movement.

6. In a longitudinal-position indicator for a rotating body having one end mounted within a closed casing and adapted to run in oil therein, the combination with a plunger mounted on said casing, and projecting thereinto, of a spring cooperating with the casing for urging said plunger with a constant force inwardly against the end of said rotating body, said plunger passing through a stepped seat and being provided with a lug adapted to engage the respective steps of said seat, and means for rotating said plunger so as to engage any desired step with said lug, whereby said plunger may be locked out of engagement with said rotating body.

7. In a longitudinal position indicator, the combination of a rotating body the longitudinal position of which is to be indicated, said rotating body having a part formed with a surface lying in a radial plane, a plunger adapted to contact with said radial surface at a point spaced from the axis of the rotating body and having means to indicate the longitudinal position of the rotating body, and means for maintaining a film of oil on the portion of said radial surface which contacts with the plunger.

8. In a longitudinal position indicator, the combination of a rotating body the longitudinal position of which is to be indicated, said rotating body having a part at the end thereof formed with a surface lying in a radial plane, a casing for said rotating body, a plunger mounted in said casing and projecting thereinto. said plunger adapted to contact with said radial surface at a point near to but spaced from the axis of rotation of said rotating body and having means for indicating the longitudinal position of said rotating body, and said casing having means for containing a body of oil contacting with said radial surface.

In testimony whereof, I have hereunto subscribed my name this 26th day of April, 1920.

WARREN B. FLANDERS.